Patented Mar. 8, 1932

1,848,644

UNITED STATES PATENT OFFICE

WILLIAM HENRY MOSS, OF CUMBERLAND, MARYLAND, ASSIGNOR TO CELANESE CORPORATION OF AMERICA, OF NEW YORK, N. Y., A CORPORATION OF DELAWARE

SYNTHETIC RESIN AND PROCESS OF MAKING THE SAME

No Drawing.   Application filed October 21, 1927.   Serial No. 227,869.

This invention relates to the use of the condensation products of phenols and ketones in the preparation of a synthetic resin by the further condensation of these products with formaldehydes or other aldehydes.

The production of resins of both the insoluble and the soluble types by the condensation of phenols and formaldehydes is well known, and the value of the usefulness of each type is judged by the subsequent use for which such resins are intended.

An object of this invention is the production of a synthetic resin soluble in alcohol, acetone, etc., which is free from excess of any of the materials used in making it, and which has a high melting point. A further object of this invention is to produce a resin, which, when used alone as the non-volatile constituent of a solution or lacquer or as a constituent of a lacquer together with such other non-volatiles as cellulose esters, particularly cellulose acetate will give lacquer films which are hard, tough and resistant to light and to weather. Other objects of this invention will appear from the following detailed description.

I have found that the condensation product of two molecules of phenol and one molecule of acetone—that is, the product commonly known as diphenylol propane having the empirical formula $C_{15}H_{16}O_2$ and the probable constitutional formula:—

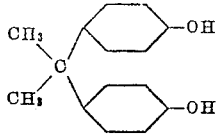

is especially suitable for further condensation with formaldehyde to produce a resin above described and that when condensed in the quantities and in the manner hereinafter described, a resin of high quality and particularly useful for admixture with other constituents of a cellulose acetate lacquer is produced.

Further I have found that when a synthetic resin is desired for use in lacquer for outdoor exposure, the value of the resin rapidly decreases when small quantities of the reactants used in its manufacture remain uncombined; this probably being due in general to the decreased water resistance of the resin due to the presence of water soluble products.

In consequence of this, it is common practice to bake such lacquer films after their application, the said baking having the effect of either driving off the excess reactants or further condensing them, whereby a final hard and weather resistant coat is obtained. However, in the use of such resins in lacquer, it is often not convenient or economical to bake them after application and for such purpose, a resin without excess reactants is much more valuable than one containing them. It is well known that in any process of preparation of resins by which the excess reactants is removed, there is introduced at the same time a considerable risk of further condensation to the insoluble resin and its subsequent ruin for use in a lacquer.

I have found that in the preparation of a resin from the aforementioned diphenylol propane and formaldehyde in the quantities and under the conditions hereinafter described; the excess reactants can be removed to any desired degree of completeness without risk of over condensation. Further the resin when thus produced has a melting point of about 140 to 150° C., which is much above that of ordinary fusible resins and approaches that of the most highly valued natural resins. When heated to this temperature, the resin melts to a clear liquid which becomes more limpid as the temperature is raised, and which can be held liquid for a considerable time, i. e., a resin of high melting point is obtained having all the properties of a nonreactive synthetic resin and which has not the undesirable properties due to free reactants with which such resins are usually contaminated. For use in a cellulose acetate or other cellulose ester lacquers, each of these properties, to wit the high melting point, the freedom from reactants, and its stability when heated and the absence of risk of over condensation, makes it more valuable than any low melting point resin of the nonreactive type or the higher melting point reactive type of resin.

I have further found that the various resins that have been produced from the aforesaid diphenylol propane and formaldehyde are not only inferior in melting point, stability, and freedom from excess reactants, but are also less compatible or miscible with cellulose acetate to form clear lacquer films, than is the resin produced from diphenylol propane and formaldehyde in accordance with my invention. Further, I have found that whilst the preparation of this resin is somewhat similar to the general method or preparation of resins from phenols and aldehydes as is disclosed in my copending application Serial No. 217,535 filed Sept. 3, 1927 which has matured into Patent No. 1,743,680, yet the increased stability, melting point, etc. of this resin make it possible to vary the procedure therein described with advantage.

In order to further elucidate my invention, the following specific example of one mode of carrying out the same is given.

One gram molecule of diphenylol propane (either highly purified or crude) is heated together with one gram molecule of formaldehyde or with up to 10% excess of this (more is not necessary) in the presence of 0.1 to 5% of one gram molecule of a catalyst such as phosphoric acid. It is preferable that this heating should be accompanied by stirring, and that where heating is done by means of a liquid such as oil or by steam in a jacket surrounding the vessels containing the reactants, the temperature of the oil or steam should be about 120 to 130° C. If direct heating is employed and the mixture of solution allowed to boil without stirring, the results are not quite so satisfactory.

The above mixture yields at first a clear solution, from which after a greater or less time depending on the amount of catalysts, degree of heating, etc., a lower oily layer separates out from an upper watery layer.

Owing to the higher melting point of the ultimate product of this reaction, the lower layer is less flowable than that obtained from a similar mixture of phenol and formaldehyde, so that it is particularly necessary to continue the stirring and the heating above 100° C. The heating is continued until a sample of the lower layer solidifies at about 50 to 60° C. or until an analysis of the upper layer shows that only a few per cent of the original formaldehyde remains uncombined. The upper layer is removed, and the resin is washed by stirring with hot water alone, or with hot water containing an alkali such as sodium carbonate in solution. The sodium carbonate used may be sufficient to convert the phosphoric acid used as a catalyst to the di- or trisodium phosphate or even in excess of this, but it is preferably sufficient to convert it to the disodium phosphate. The resin may be steam distilled or vacuum distilled, with or without the addition of other substances, such as oils, solvents, catalysts, etc., in any stage of its purification. It is preferably washed further with water, separated from excess of wash water, and melted and heated to 180 to 200° C. whereby all remaining water is removed and a clear resin with the melting point of about 140 to 150° C. is obtained.

The resin obtained by the foregoing procedure is nonreactive and stable, but free from the materials from which it was produced and strongly water resistant. It is particularly suitable for use in lacquers either alone or with cellulose esters, giving films which, without subsequent baking, have very desirable properties of hardness, toughness, water resistance, etc.

The above detailed description is given merely by way of illustration. It is to be understood that many variations may be made therein without departing from the spirit of my invention. For instance, any acids other than phosphoric acid, such as boric acid, hydrochloric acid, sulphuric acid, etc. may be used as catalysts provided that approximately the same proportions of reacting substances are used, and that the acids are removed or neutralized after the formation of the initial soft resin. The products of condensation of higher ketones, such as methyl ethyl ketone, or di-ethyl ketone, with phenol may be substituted for the diphenylol propane or acetone phenol condensation product above mentioned.

It is particularly surprising that in my process one molecule of a dihydroxy body such as diphenylol propane should require for its complete conversion into a higher melting point resin not two molecules of formaldehyde as would be assumed between a comparison of its formula with other substances such as phenol and cresol and the well known reaction of these substances with formaldehyde, but only one molecule of formaldehyde. It is possible that under some conditions two or more molecules of formaldehyde may be combined with the diphenylol propane, but the remarkable fact is that for the preparation of a high melting point resin free from excess of either reactant, only one molecule of formaldehyde suffices.

The use of this resin in cellulose ester lacquer together with softeners and pigments is more fully described in my copending application No. 230,186, filed October 31, 1927. This resin may be used also in the plastic art in the same manner as other similar resins. It may also be used as the starting material for making other resins. Obviously it is understood that the melting point of the resin as given is that of the comparatively pure product and that the presence of impurities will lower the melting point.

Having described my invention what I claim and desire to secure by Letters Patent is:

1. Process of producing a synthetic resin comprising reacting one gram molecule of a product obtained by the condensation of a ketone with a phenol with an amount less than two gram molecules of an aldehyde at a temperature above 100° C.

2. Process of producing a synthetic resin comprising reacting one gram molecule of an acetone-phenol condensation product with an amount less than two gram molecules of an aldehyde at a temperature above 100° C.

3. Process of producing a synthetic resin comprising reacting one gram molecule of an acetone-phenol-condensation product with not substantially more than 1.1 gram molecule of an aldehyde at a temperature above 100° C.

4. Process of producing a synthetic resin comprising reacting one gram molecule of an acetone-phenol condensation product with substantially one gram molecule of an aldehyde at a temperature above 100° C. until a resin of a melting point above 140° C. is formed.

5. Process of producing a synthetic resin comprising reacting one gram molecule of an acetone-phenol condensation product with not substantially more than 1.1 gram molecule of an aldehyde at a temperature between 120° to 130° C. while stirring.

6. Process of producing a synthetic resin comprising reacting one gram molecule of a product obtained by the condensation of a ketone with a phenol with substantially one gram molecule of an aldehyde at a temperature between 120° to 130° C. while stirring 7. Process of producing a synthetic resin comprising reacting one gram molecule of an acetone-phenol condensation product with substantially one gram molecule of an aldehyde at an elevated temperature above 100° C. while stirring and in the presence of an acidic catalyst.

8. Process of producing a synthetic resin comprising reacting one gram molecule of an acetone-phenol condensation product with substantially one gram molecule of an aldehyde at an elevated temperature above 100° C. while stirring and in the presence of phosphoric acid as catalyst.

9. Process of producing a synthetic resin comprising reacting one gram molecule of an acetone-phenol condensation product with substantially one gram molecule of an aldehyde at a temperature above 100° C. while stirring and in the presence of phosphoric acid as catalyst until two layers are formed, separating the lower layer, washing the same with an aqueous liquid and distilling the same.

10. Process of producing a synthetic resin comprising reacting one gram molecule of an acetone-phenol condensation product with substantially one gram molecule of an aldehyde at a temperature above 100° C. while stirring and in the presence of phosphoric acid as catalyst until two layers are formed, separating the lower layer, washing the same with an aqueous liquid, and distilling the same to obtain a fusible resin having a melting point of above 140° C.

11. Process of producing a synthetic resin comprising reacting an acetone-phenol condensation product with an aldehyde at a temperature above 100° C. in the presence of phosphoric acid as catalyst.

12. Process of producing a synthetic resin comprising reacting an acetone-phenol condensation product with a formaldehyde at a temperature above 100° C. in the presence of phosphoric acid as catalyst.

13. A resin formed by the condensation with an aldehyde of a product obtained by the condensation of a ketone with a phenol having a melting point above 140° C.

14. An acetone-phenol formaldehyde condensation product having a melting point above 140° C.

15. A resin formed by the condensation with formaldehyde of a product obtained by the condensation of a ketone with a phenol having a melting point between 140 to 150° C.

16. An acetone-phenol formaldehyde condensation product having a melting point between 140 to 150° C.

In testimony whereof, I have hereunto subscribed my name.

WILLIAM H. MOSS.